US009878929B2

(12) United States Patent
Dulko

(10) Patent No.: US 9,878,929 B2
(45) Date of Patent: Jan. 30, 2018

(54) STABLE SALT-FREE POLYALUMINUM CHLOROSULFATES

(71) Applicant: USALCO, LLC, Baltimore, MD (US)

(72) Inventor: James M. Dulko, Pasadena, MD (US)

(73) Assignee: USALCO, LLC, Baltimore, MD (US)

(*) Notice: Subject to any disclaimer, the term of this patent is extended or adjusted under 35 U.S.C. 154(b) by 0 days.

(21) Appl. No.: 15/478,485

(22) Filed: Apr. 4, 2017

(65) Prior Publication Data
US 2017/0203981 A1 Jul. 20, 2017

Related U.S. Application Data

(63) Continuation of application No. 14/333,963, filed on Jul. 17, 2014, now Pat. No. 9,611,155.

(60) Provisional application No. 61/847,383, filed on Jul. 17, 2013.

(51) Int. Cl.
C02F 1/52 (2006.01)
B01D 21/01 (2006.01)
C02F 103/28 (2006.01)

(52) U.S. Cl.
CPC ............ C02F 1/5245 (2013.01); B01D 21/01 (2013.01); C02F 2103/28 (2013.01)

(58) Field of Classification Search
CPC .................................................... C02F 1/5236
See application file for complete search history.

(56) References Cited

U.S. PATENT DOCUMENTS

| | | | |
|---|---|---|---|
| 3,270,001 A | 8/1966 | Morimoto | |
| 3,497,459 A | 2/1970 | Nakamura et al. | |
| 3,544,476 A | 12/1970 | Aiba et al. | |
| 3,929,666 A | 12/1975 | Aiba et al. | |
| 4,069,299 A * | 1/1978 | Hodgson | C01F 7/56 423/437.1 |
| 4,450,092 A * | 5/1984 | Huang | C02F 1/54 210/725 |
| 4,981,673 A | 1/1991 | Boutin et al. | |
| 5,076,940 A | 12/1991 | Boutin et al. | |
| 5,215,245 A * | 6/1993 | Moyer | B21B 1/227 228/152 |
| 5,246,686 A | 9/1993 | Cuer et al. | |
| 5,348,721 A | 9/1994 | Murphy et al. | |
| 5,381,172 A * | 1/1995 | Ujita | B41J 2/17533 347/86 |
| 5,518,706 A * | 5/1996 | Boutin | C02F 1/5245 210/702 |
| 5,603,912 A | 2/1997 | Giovanniello et al. | |
| 5,879,651 A * | 3/1999 | Dufour | C01F 7/002 210/723 |
| 5,938,970 A * | 8/1999 | Reilly, Jr. | C01B 13/363 162/181.2 |
| 5,985,234 A * | 11/1999 | Dulko | C01F 7/007 210/702 |
| 5,997,838 A * | 12/1999 | Dulko | C01F 7/007 210/702 |
| 6,036,935 A * | 3/2000 | Dulko | C01F 7/007 210/716 |
| 6,548,037 B1 | 4/2003 | Pozzoli | |
| 8,486,474 B2 * | 7/2013 | Sarir | C13B 20/06 426/533 |
| 9,611,155 B2 | 4/2017 | Dulko | |
| 2005/0266181 A1* | 12/2005 | Bi | B41M 5/52 428/32.34 |
| 2006/0003891 A1* | 1/2006 | Zhang | C02F 1/5245 502/303 |
| 2006/0013971 A1* | 1/2006 | Chen | B41M 5/52 428/32.34 |
| 2007/0092433 A1 | 4/2007 | Janak et al. | |
| 2010/0061919 A1 | 3/2010 | Grove et al. | |
| 2010/0113320 A1* | 5/2010 | Cumberland | C11D 1/662 510/437 |
| 2010/0150818 A1* | 6/2010 | Haase | C02F 1/50 423/580.1 |
| 2011/0003097 A1* | 1/2011 | Chen | B41M 5/504 428/32.21 |
| 2011/0165303 A1 | 7/2011 | Bushong | |
| 2015/0021514 A1* | 1/2015 | Dulko | C02F 1/5236 252/175 |

FOREIGN PATENT DOCUMENTS

EP 0779242 A2 6/1997
WO 9711029 A3 3/1997

OTHER PUBLICATIONS

European Patent Office, Partial Supplementary European Search Report—Application No. EP14826364.3 dated Jan. 24, 2017, 6 pages.
Edwards, Marc, et al., "Chloride-to-sulfate mass ratio and lead leaching to water," Journal AWWA, vol. 99, No. 7, pp. 96-109, Jul. 2007.
International Searching Authority, International Search Report—Application No. PCT/US2014/046991, dated Dec. 15, 2014 together with the Written Opinion of the International Searching Authority, 20 pages.

* cited by examiner

Primary Examiner — Nicole M Buie-Hatcher
Assistant Examiner — M. Reza Asdjodi
(74) Attorney, Agent, or Firm — Sunstein Kann Murphy & Timbers LLP

(57) ABSTRACT

A process for producing a polyaluminum chlorosulfate (PACS) includes providing solid aluminum hydroxychloride, providing aluminum sulfate, mixing the solid aluminum hydroxychloride with the aluminum sulfate, in the presence of water, to form an aqueous milky suspension, wherein, on a dry weight basis, the ratio of the aluminum hydroxychloride to the aluminum sulfate is 0.75-20 parts aluminum hydroxychloride to 1 part aluminum sulfate, and maintaining the milky suspension for a period sufficient to allow the milky suspension to form a clear to slightly turbid solution including the PACS, the PACS having a basicity of 55 to 75%, the average molecular weight of the PACS is greater than or equal to 95 and less than or equal to 111, and salts present in the PACS comprise 0-1.0% sodium chloride by weight and 0-1.0% sodium sulfate by weight.

17 Claims, No Drawings

STABLE SALT-FREE POLYALUMINUM CHLOROSULFATES

CROSS-REFERENCE TO RELATED APPLICATIONS

This patent application is a continuation application of U.S. patent application Ser. No. 14/333,963 filed on Jul. 17, 2014, which claims the benefit of U.S. Provisional Patent Application No. 61/847,383 filed Jul. 17, 2013, the disclosures of which are incorporated by reference herein in their entirety.

TECHNICAL FIELD

The present invention is directed to polyaluminum chlorosulfates (PACSs) and methods of making and using them.

BACKGROUND ART

Polyaluminum chlorides (PACls) and polyaluminum chlorosulfates (PACSs) are used in water treatment and in the production of paper, antiperspirants, foods and pharmaceuticals. In wastewater treatment processes, they serve as flocculants and coagulants. Processes for producing polyaluminum chlorides and polyaluminum chlorosulfates with characteristics favorable for water treatment have been described in a number of previous publications, including: U.S. Pat. Nos. 5,246,686; 4,981,673; 5,076,940; 3,929,666; 5,348,721; 6,548,037; 5,603,912; and 5,985,234.

Low basicity PACls (0-45% basicity) are very stable in solution but can also be very corrosive. They tend to form small flocs, depress pH and require a high concentration relative to other products used in water treatment. High basicity PACls (45-75% basicity) are somewhat better as coagulants in water treatment, but can cost more to manufacture and have a limited shelf life. Highly basic aluminum chlorohydrate (83% basicity) solves most issues of its lower basicity counterparts, but is not effective as a coagulant in cold water or highly turbid water.

In contrast, PACSs are highly efficient coagulants and work well in either cold or highly turbid waters. The main problem with these compounds is that they have a limited shelf life and degrade rapidly at elevated temperatures. PACSs may be made by shearing sodium aluminate into a basic aluminum chlorosulfate solution. However, this produces as much as 5-10% byproduct sodium chloride and sodium sulfate which becomes an impurity in water treatment operations and results in an elevation of the chloride and sodium content of the treated waters. The by-product salts also reduce the concentration of the PACSs and shorten the shelf life of these products.

As an alternative, PACS may be made by mixing lime with a mixture of aluminum chloride and aluminum sulfate solutions. In this case, by-product calcium sulfate or gypsum are produced which need to be disposed of. It is also difficult to produce basicities of greater than 50% using this technology.

As mentioned previously, solutions of PACls or PACSs are often used in water treatment procedures. However, waters with a high chloride-to-sulfate mass ratio (CSMR) can cause galvanic corrosion of solder and thereby create higher lead levels in drinking water (Edwards, et al., *JAWWA* 99(7):96-109 (July 2007)). Use of all chloride PACls and low sulfate PACS can make this problem worse, as can PACSs that contain by-product sodium chloride.

SUMMARY OF THE INVENTION

The present invention is directed to polyaluminum chlorosulfates (PACSs) that are high in basicity and that have a high percentage by weight of sulfate. The PACSs are made by adding solid aluminum hydroxychloride to an aqueous solution of aluminum sulfate or by diluting a mixture of solid, dry aluminum sulfate and aluminum hydroxychloride with water. The invention includes methods of using the PACS formed by these procedures in the treatment of water as well as packages containing dry aluminum hydroxychloride and aluminum sulfate as either separate components or as a mixture.

The present invention is based upon the development of methods for producing polyaluminum chlorosulfates (PACS) that have a high percentage by weight of sulfate, a high basicity and low levels of sodium chloride and sodium sulfate. Importantly, the methods involve the use of two components, aluminum sulfate and aluminum hydroxychloride, that can be maintained in a dry, solid state until immediately before they are used in making PACSs. As a result, these components can be shipped dry (in either a mixed or unmixed form) without transporting water and are less susceptible to degradation by heat. Water treatment compositions containing the PACS of the invention work efficiently in cold or turbid water and are effective in a broad pH range. Finally, because the PACSs of the invention have a high sulfate to mass ratio, they are less likely to contribute to high lead levels in drinking water than PACS with a low ratio.

In its first aspect, the invention is directed compositions comprising PACSs having a sulfate content of 0.5% to 13% by weight or greater for the product in solution, or 2%-30% by weight for the dry product, and a basicity of 65%-70% for a first embodiment or a basicity of 58%-62% for a second embodiment. These compositions are further characterized by having less than 1.0%, preferably less than 0.5% or less than 0.2%, and most preferably less than 0.1% of sodium chloride and less than 1.0%, preferably less than 0.5% or less than 0.2%, and most preferably less than 0.1% sodium sulfate by weight. The PACS of the invention have the formula: $Al(OH)_x Cl_{(3-x-2y)}(SO_4)_y$, (formula I), in which:

x is 1.78 to 2.02;
y is 0.03 to 0.45;
x+y/2 is 1.8 to 2.1;
the ratio of Al to $SO_4$ is 2 to 34; the ratio of Al to Cl is 0.9 to 3.0; and the ratio of Al to OH is 0.5 to 0.6;
basicity is 55 to 70%; and
the average molecular weight is greater than or equal to 95 and less than or equal to 111.

Preferred PACSs of formula I may be characterized as follows:
PACS 1: x=1.78-1.82; 3−x−2y=0.35-1.1; y=0.065-0.45; and x+y/2=1.83-2.02;
PACS 2: x=1.95-2.02; 3−x−2y=0.6-1.0; y=0.03-0.20; and x+y/2=1.95-2.1.

In another embodiment, the invention is directed to a process for producing the compositions described above and comprising the steps of: a) adding 55-83% basic solid aluminum hydroxychloride to an aqueous aluminum sulfate solution to form a milky suspension; and b) maintaining the milky suspension for a period sufficient (generally from 2-16 hours, preferably 3 to 6 hours) to form a clear solution. The process should be carried out at a temperature below 50 degrees centigrade (e.g., at 5-50 degrees centigrade), and preferably at 10-40 degrees centigrade, and most preferably around 20-25 degrees centigrade. The aqueous aluminum sulfate solution used in the process may also be made by dissolving solid aluminum sulfate in water after the addition of the basic solid aluminum hydroxychloride. On a dry weight basis, the ratio of aluminum hydroxychloride to aluminum sulfate should typically be 0.75-20 parts aluminum hydroxychloride to 1 part aluminum sulfate. For example, 0.75-20 parts of dry aluminum hydroxychloride may be added for each one part of dry aluminum sulfate. Other ranges include 5.0-10.0 parts of dry aluminum hydroxychloride for each part of dry aluminum sulfate and 10.0-20 parts of dry aluminum hydroxychloride for each part of dry aluminum sulfate. The clear solution produced is, optionally, formed by mixing the milky suspension while gradually increasing its temperature.

Compositions may also be made by: a) dissolving a mixture of solid aluminum sulfate and solid aluminum hydroxychloride in water to form a milky suspension; and then b) maintaining the milky suspension for a period sufficient to allow the suspension to form a clear solution. The process should preferably be carried out at the temperatures indicated above and the solid aluminum sulfate may be dissolved in water before adding the solid aluminum hydroxychloride. The same ratios of aluminum hydroxychloride to aluminum sulfate discussed above may be used.

In another aspect, the invention is directed to a package, e.g., bags or drums, comprising two components, solid dry aluminum sulfate and solid dry aluminum hydroxychloride, that can be used to form a coagulant PACS for wastewater treatment. The package may take the form of a single container having solid aluminum sulfate and solid aluminum hydroxychloride in the form of a dry mixture (e.g, solid aluminum hydroxychloride having less than 3 waters of hydration). The ratio of solid aluminum sulfate to solid aluminum hydroxychloride in the mixture is such that, by adding water, a solution may be formed comprising PACS of formula (I):

$$Al(OH)_xCl_{(3-x-2y)}(SO_4)_y \quad \text{(I), in which:}$$

x is 1.78 to 2.02;
y is 0.03 to 0.45;
x+y/2 is 1.8 to 2.1;
the ratio of Al to SO4 is 2 to 34; the ratio of Al to Cl is 0.9 to 3.0; and the ratio of Al to OH is 0.5 to 0.6;
the basicity is 55 to 70%; and
the average molecular weight is greater than or equal to 95 and less than or equal to 111; and
the solution comprises less than 0.1% sodium chloride by weight and less than 0.1% sodium sulfate by weight.

In terms of dry weights of solid aluminum sulfate and solid aluminum hydroxychloride in the dry mixtures present in packages, a ratio of 0.75-20 parts dry aluminum hydroxychloride to 1 part dry aluminum sulfate may be used. Examples of ranges include: 0.75-5.0 parts of dry aluminum hydroxychloride to one part of dry aluminum sulfate; 5.0-10.0 parts of dry aluminum hydroxychloride for each part of dry aluminum sulfate; and 10.0-20.0 parts of dry aluminum hydroxychloride for each part of dry aluminum sulfate.

In preferred embodiments, solutions are formed containing PACS 1, or 2, in which the parameters of formula (I) are as follows:
PACS 1: x=1.8-1.9; 3−x−2y=0.72-0.78; y=0.18-0.22; and x+y/2=1.9-2.0;
PACS 2: x=2.0-2.3; 3−x−2y=0.6-1.0; y=0.01-0.10; and x+y/2=2.0-2.4.

In another aspect, the invention encompasses a method of treating water to remove impurities by adding a sufficient amount of a PACS described above to the water to coagulate and flocculate impurities and subsequently separating the water from the coagulated or flocculated material. The amount of PACS required may be determined using procedures well known in the art and separation may be achieved by standard procedures such as allowing coagulated or flocculated materials to sediment and/or employing filtration methods.

Starting with solid, dry components, the overall procedure involves forming an aqueous solution from solid aluminum sulfate and solid aluminum hydroxychloride (as discussed above) and then adding this to wastewater to coagulate impurities. For example, in a preferred embodiment, the process includes: a) dissolving solid aluminum sulfate in water to form a solution; b) mixing solid 62-83% basic aluminum hydroxychloride into the aluminum sulfate solution formed in step a) to form a milky suspension comprising PACS; c) maintaining the milky suspension for a period sufficient to allow the suspension to form a clear solution; and d) adding the clear solution of step c) to wastewater to coagulate or flocculate impurities.

The PACS used in the water treatment procedures should have the characteristics described above. Specifically, the PACS should have formula: $Al(OH)_xCl_{(3-x-2y)}(SO_4)_y$, (I), wherein: x is greater than or equal to 1.78 and less than or equal to 2.02; y is greater than or equal to 0.03 and less than or equal to 0.45; x+y/2 is greater than or equal to 1.83 and less than or equal to 2.02; and the basicity is from 55% to 70%. The preferred molecular weight for the PACS is greater than or equal to 95 and less than or equal to 111. Ratios of elements in the PACS may be: Al:SO4=2-34; Al:Cl=0.9-3.0; and Al:OH=0.5-0.6.

Definitions

Polyaluminum Chlorides or Basic Aluminum Chlorides: Polyaluminum chlorides are products of aluminum chloride hydroxide, $AlCl(OH)_2$, $AlCl_2(OH)$, and $Al_2Cl(OH)_5$. A representative formula is: $Al_2Cl_{6-n}(OH)_n$, where n=1 to 5.1. It is thought that, when these products are diluted, polymeric species such as: $Al_{13}O_4(OH)_{24}(H_2O)_{12}+7Cl$ are formed.

Polyaluminum Chlorosulfates or Basic Aluminum Chlorosulfates: These compounds can best be described by the formula: $Al(OH)_xCl_{(3-x-2y)}(SO_4)_y$, wherein x=1 to 2 and y is greater than 0 and less than or equal to 0.5. The polymeric species formed upon dilution may be expressed as: $Al_{13}O_4(OH)_{24}(H_2O)_{12}+5Cl+SO_4$.

Percent Basicity: As typically used in the art, percent basicity is defined as (% OH)(52.91)/(% Al). On a molar level, this may be expressed as ((OH)/(Al))/3 multiplied by 100. Thus, $Al(OH)(H_2O)_5+2Cl$ has a basicity of 33%. Basicities discussed in the text in connection with products made by the present procedure reflect formula basicities based upon hydroxide content.

Dry Aluminum Sulfate: This is a solid compound of crystallized, hydrated aluminum sulfate. It can be manufactured from aluminum oxide trihydrate, clays or bauxite. Typically, dry aluminum sulfate contains 14.3 waters of hydration, but 6.5 and 18 waters of hydration are also commercially available. These products typically have a small amount of aluminum hydroxide, usually less than 1% iron content (expressed as $Fe_2O_3$), and an amount of insolubles that varies depending on the manufacturer and grade. It is preferred to utilize aluminum sulfate manufactured from aluminum hydroxide to limit the impurities in a PACs product.

Aluminum Sulfate solutions: These are solutions of dry aluminum sulfate of approximately 48.5 wt % of the 14.3 hydrated aluminum sulfate. They are widely available commercially and can contain as much as 0.5% aluminum hydroxide and as much as 1% $Fe_2O_3$.

Solid aluminum hydroxychloride: These are compounds of the formula: $Al_2(OH)_n(Cl)_{6-n} \cdot zH_2O$, where n is greater than or equal to 3 and less than or equal to 5.1 and z is greater than zero and less than or equal to 3. The waters of hydration vary with basicity of the solid aluminum hydroxychloride, with waters of hydration decreasing as basicity increases. For example a 70% basic compound would have about 1.2 waters of hydration whereas an 80% basic compound would have about 0.5 waters of hydration. These compounds can be manufactured from decomposing aluminum chloride hexahydrate to the desired basicity.

DETAILED DESCRIPTION OF THE INVENTION

Polyaluminum Chlorosulfates

The present invention is directed to highly sulfated, high basicity polyaluminum chlorosulfate (PACS) compositions that have essentially no (less than 0.5%, and preferably less than 0.1% or 0.05%) by-product salts. These compositions are highly effective at removing impurities from water and wastewater. The PACS have the chemical formula: $Al(OH)_x Cl_{(3-x-2y)}(SO_4)_y$, (formula I), where: $1.78 \leq x \leq 2.02$; $0.03 \leq y < 0.45$; and $1.8 \leq x+y/2 \leq 2.1$. Ratios are preferably: $Al:SO_4 = 2$ to 34 $Al:Cl = 0.9$ to 3.0; and $Al:OH = 0.5$ to 0.6 Basicity should be 55 to 70% by weight (defined as x/3n) and the molecular weight is preferably at least 95 and less than or equal to 111. Specific PACSs of the invention include: $Al(OH)_{1.83}Cl_{0.75}(SO_4)_{0.21}$; and $Al(OH)_{2.01}Cl_{0.93}(SO_4)_{0.03}$.

Processes of Making PACSs

The present invention includes a process for producing polyaluminum chlorosulfate by mixing dry, solid aluminum hydroxychloride into an aqueous solution of aluminum sulfate. The aluminum sulfate can be purchased commercially or made using processes well known in the art. Aluminum sulfate is manufactured by digesting an aluminum source (aluminum oxide trihydrate, bauxite, etc.) in a solution of approximately 50 wt % sulfuric acid. The mixture is reacted until there is a slight excess of aluminum hydroxide in solution.

Solutions of liquid aluminum sulfate appropriate for the making of PACSs may be prepared from a molten aluminum sulfate solution by diluting it to about 8.3% aluminum oxide content. Dry aluminum sulfate appropriate for the making of PACSs may be prepared by cooling molten aluminum sulfate and then grinding to the appropriate grind specification at a concentration of 17% aluminum oxide. This should be diluted with water to a final concentration of a 1 to 70 wt % equivalent of liquid aluminum sulfate in water prior to the addition of the solid aluminum hydroxychloride. The amount of water is dependent on the basicity of the solid aluminum hydroxychloride and the desired concentration of the PACS. If the PACS is going to be used on site it can be made as dilute as practical, but if it is going to be shipped elsewhere the concentration of the solution should be maximized. Solutions of PACS can be made as high as 20% aluminum oxide or higher. According to a first embodiment, the dry aluminum sulfate may be diluted to 70-100% equivalent of liquid aluminum sulfate in water prior to the addition of the solid aluminum hydroxychloride. According to a second embodiment, the dry aluminum sulfate may be diluted to 30 to 70% equivalent of liquid aluminum sulfate in water prior to the addition of the solid aluminum hydroxychloride. According to a third embodiment, the dry aluminum sulfate may be diluted to 4 to 30% equivalent of liquid aluminum sulfate in water prior to the addition of the solid aluminum hydroxychloride.

The solid aluminum hydroxychloride used in the making of PACSs can be produced by thermally decomposing aluminum chloride hexahydrate in a fluid bed dryer until the desired basicity is achieved. This process may be represented chemically as follows:

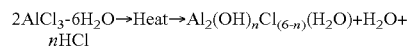

$2AlCl_3 \cdot 6H_2O \rightarrow Heat \rightarrow Al_2(OH)_n Cl_{(6-n)}(H_2O) + H_2O + nHCl$ The final basicity of the aluminum hydroxychloride should preferably be 62-83% basic, and should have waters of hydration of 0 to 1.5, preferably 0.5 to 1.2, and most preferably 0.8 to 1.2. It should be added to the aluminum sulfate solution while the solution is mixed using any of devices known in the art for this purpose.

Mixing of the solid aluminum hydroxychloride should continue until it has been mostly dissolved and until the final solution has a clear to slightly turbid appearance. When performed at about room temperature, this will typically take from 3 to 8 hours. If desired, the solution may be mildly heated to speed clarification but the temperature should preferably not exceed 50 degrees centigrade. In general, 10-40 degrees centigrade is a good range for carrying out the reaction at atmospheric pressure.

As an alternative, the PACSs of the invention can be made from a dry, solid mixture of aluminum sulfate and aluminum hydroxychloride. The aluminum hydroxychloride should have a basicity of 62-83% and may be present in the mixture, for example, at a ratio of between 40 grams per gram of aluminum sulfate and 2 grams per gram of aluminum sulfate. The mixture should be diluted with water to a final concentration of 20% to 40% PACS and mixed until all of the aluminum sulfate and aluminum hydroxychloride has been dissolved. All of the other parameters and procedures are the same as those described above.

The procedures described above should result in the formation of PACSs with a sulfate content of at least 0.5% by weight (e.g., 6-8%) and a basicity of 55% or greater (e.g., 58-75%). Most typically, the PACS solution will be added to raw water or wastewater to coagulate and remove impurities. Typically, the PACSs are mixed into raw water at dosage of 10 to 100 mg/L. The water is generally rapidly mixed with the PACS and then is slowly mixed for several minutes. Mixing is then stopped and the impurities that have been attracted to the PACS and are allowed to settle to the bottom of the water. The supernate is then filtered and proceeds through the rest of the treatment process. PACS can be used in wastewater treatment to remove phosphorous and/or impurities. When used for this, 50 to 300 mg of PACS is typically used per liter of wastewater.

Advantages

The highly sulfated PACSs of the present invention are highly effective as flocculants in water treatment procedures and should be less prone to increase lead levels in water than PACls or PACS with a lower percentage of sulfates. Typical high basicity PACSs are made by shearing sodium aluminate into a solution of basic aluminum chlorosulfates. Since these products degrade with temperature, the PACSs are partially decomposed by the heat from the shearing and the heat of neutralization between the alkaline aluminate and the acidic basic aluminum chlorosulfates. In contrast, the products of the present invention are manufactured at low temperatures thereby avoiding heat degradation. The PACSs are preferably made from solid components that can be shipped dry and reacted after receipt by a purchaser. This should reduce shipping costs, minimize degradation due to heat and/or storage, and allow end users to maintain larger stocks. The PACS described herein should be stable for long periods, work efficiently in cold or turbid water and be effective in a broad pH range.

EXAMPLES

Example 1

In a 600 ml beaker, 130 grams of commercially available liquid aluminum sulfate (8.3% $Al_2O_3$) is diluted with 202 grams of water. The beaker is stirred on a magnetic stirrer to which is added 146 grams of a solid aluminum hydroxychloride (42% $Al_2O_3$, 71% basic) powder. The solution is allowed to mix for 24 hours after which the milky solution becomes clear. The solution yields a PACS solution of 15% $Al_2O_3$, 60.5% basic and 6.3% sulfate.

Example 2

In a pint jar, 350 grams of a solid aluminum hydroxychloride (41% $Al_2O_3$, 70% basic) powder is blended with 50 grams of dry alum (17% $Al_2O_3$). This produces a dry PACS of 38% $Al_2O_3$, 66% basic and 6% sulfate. Six months later the contents of the jar are added to a one liter beaker that contains 600 mls of water, while stirring on a magnetic stirrer. The solution is allowed to mix for 24 hours, after which the milky solution becomes clear. The solution yields a PACS solution of 15.2% $Al_2O_3$, 66.1% basic and 2.4% sulfate.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

The invention claimed is:

1. A process for producing a polyaluminum chlorosulfate (PACS), the process comprising:
   a) providing solid aluminum hydroxychloride having formula (I):

$$Al_2(OH)_n(Cl)_{6-n}\text{-}zH_2O \quad (I)$$

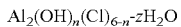
   where 3≤n≤5.1, and 0<z≤3;
   b) providing aluminum sulfate;
   c) mixing the solid aluminum hydroxychloride with the aluminum sulfate, in the presence of water, to form an aqueous milky suspension, wherein, on a dry weight basis, the ratio of the aluminum hydroxychloride to the aluminum sulfate is 0.75-20 parts aluminum hydroxychloride to 1 part aluminum sulfate; and
   d) maintaining the milky suspension of step c) for a period sufficient to allow the milky suspension to form a clear to slightly turbid solution comprising the PACS having formula (II):

$$Al(OH)xCl(3-x-2y)(SO4)y \quad (II)$$

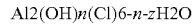
   wherein 1.78<x<2.02, 0.03<y<0.45, and 1.8<x+y/2<2.1; Al:SO4=2 to 34; Al:Cl=0.9 to 3.0; Al:OH=0.5 to 0.6; the basicity is 55 to 75%;
   the average molecular weight of the PACS is greater than or equal to 95 and less than or equal to 111; and
   salts present in the PACS comprise 0-1.0% sodium chloride by weight and 0-1.0% sodium sulfate by weight.

2. The process of claim 1, wherein: 4≤n≤4.7, and 1<z≤3.

3. The process of claim 1, wherein the providing aluminum sulfate includes providing aqueous aluminum sulfate, and the mixing includes mixing the aqueous aluminum sulfate with the solid aluminum hydroxychloride, to form the aqueous milky suspension.

4. The process of claim 1, wherein the providing aluminum sulfate includes providing solid aluminum sulfate, and the mixing includes mixing the solid aluminum sulfate with the solid aluminum hydroxychloride to form a dry mixture and dissolving the dry mixture in the water to form the aqueous milky suspension.

5. The process of claim 1, wherein the aluminum hydroxychloride having formula (I) is between 55% to 83% basic.

6. The process of claim 1, wherein the aluminum hydroxychloride having formula (I) is between 62% to 83% basic.

7. The process of claim 1, wherein the aluminum hydroxychloride having formula (I) has 0 to 1.5 molecules of water of hydration.

8. The process of claim 1, wherein the aluminum hydroxychloride having formula (I) has 0.5 to 1.2 molecules of water of hydration.

9. The process of claim 1, wherein the aluminum hydroxychloride having formula (I) has 0.8 to 1.2 molecules of water of hydration.

10. The process of claim 1, wherein, in the PACS of formula (II):
    x=1.78 to 1.82;
    3−x−2y=0.35 to 1.1;
    y=0.065 to 0.45; and
    x+y/2=1.83 to 2.02.

11. The process of claim 1, wherein, in the PACS of formula (II):
    x=1.95 to 2.02;
    3−x−2y=0.6 to 1.0;
    y=0.03 to 0.20; and
    x+y/2=1.95 to 2.1.

12. The process of claim 1, wherein the PACS of formula (II) further comprises a sulfate content of 2.0-30% by weight in a dry state.

13. The process of claim 1, wherein the process is carried out at a temperature of 5-50 degrees centigrade.

14. The process of claim 1, wherein the process is carried out at a temperature of 10-40 degrees centigrade.

15. The process of claim 1, wherein the clear to slightly turbid solution formed in step d) is by mixing the milky suspension while gradually increasing its temperature until the clear to slightly turbid solution is obtained.

16. A package comprising two components for water treatment, wherein the components include:
    a) solid aluminum sulfate; and
    b) solid aluminum hydroxychloride having formula (I):

$$Al2(OH)n(Cl)6\text{-}n\text{-}zH2O \quad (I)$$

    where 3<n<5.1, and 0<z<3, wherein, on a dry weight basis, the ratio of the aluminum hydroxychloride to the aluminum sulfate is 0.75-20 parts aluminum hydroxychloride to 1 part aluminum sulfate such that, upon the addition of water, a solution may be formed comprising a polyaluminum chlorosulfate (PACS) of formula (II):

$$Al(OH)xCl(3-x-2y)(SO4)y \quad (II)$$

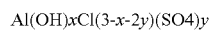
    wherein 1.78<x<2.02, 0.03<y<0.45, and 1.8<x+y/2<2.1; Al:SO4=2 to 34; Al:Cl=0.9 to 3.0; Al:OH=0.5 to 0.6; the basicity is 55 to 75%;

the average molecular weight of the PACS is greater than or equal to 95 and less than or equal to 111; and salts present in the PACS comprise 0-1.0% sodium chloride by weight and 0-1.0% sodium sulfate by weight.

17. A package according to claim 16, comprising two components for water treatment, wherein the components include:

a) solid aluminum sulfate; and b) solid aluminum hydroxychloride having formula (I):

$$Al2(OH)n(Cl)6\text{-}n\text{-}zH2O \quad (I)$$

where $4 \leq n \leq 4.7$, and $1 < z \leq 3$.

* * * * *